United States Patent
Zhang et al.

(10) Patent No.: US 11,179,997 B2
(45) Date of Patent: Nov. 23, 2021

(54) CONTROL METHOD FOR VEHICLE AIR CONDITIONER

(71) Applicants: GREE ELECTRIC APPLIANCES (WUHAN) CO., LTD, Hubei (CN); GREE ELECTRIC APPLIANCES, INC. OF ZHUHAI, Guangdong (CN)

(72) Inventors: Youlin Zhang, Guangdong (CN); Huan Zhao, Guangdong (CN); Jun Shen, Guangdong (CN)

(73) Assignees: Gree Electric Appliances (Wuhan) Co., Ltd, Hubei (CN); Gree Electric Appliances, Inc. of Zhuhai, Guangdong (CN)

( * ) Notice: Subject to any disclaimer, the term of this patent is extended or adjusted under 35 U.S.C. 154(b) by 16 days.

(21) Appl. No.: 16/645,963

(22) PCT Filed: Jun. 14, 2018

(86) PCT No.: PCT/CN2018/091356
§ 371 (c)(1),
(2) Date: Mar. 10, 2020

(87) PCT Pub. No.: WO2019/047585
PCT Pub. Date: Mar. 14, 2019

(65) Prior Publication Data
US 2020/0276878 A1   Sep. 3, 2020

(30) Foreign Application Priority Data

Sep. 11, 2017 (CN) .......................... 201710811727.1

(51) Int. Cl.
*B60H 1/00* (2006.01)
*B60L 58/12* (2019.01)

(52) U.S. Cl.
CPC ....... *B60H 1/0073* (2019.05); *B60H 1/00278* (2013.01); *B60H 1/00657* (2013.01);
(Continued)

(58) Field of Classification Search
CPC .............. B60H 1/00657; B60H 1/0073; B60H 1/00278; B60H 1/00735; B60H 2001/2243; B60H 2001/2234
See application file for complete search history.

(56) References Cited

U.S. PATENT DOCUMENTS

| | | |
|---|---|---|
| 6,745,582 B1 | 6/2004 | Urbank et al. |
| 2006/0137871 A1 | 6/2006 | Roehm |

(Continued)

FOREIGN PATENT DOCUMENTS

| | | |
|---|---|---|
| CN | 102447148 A | 5/2012 |
| CN | 202283863 U | 6/2012 |

(Continued)

OTHER PUBLICATIONS

English translation of CN104842743A published on Aug. 19, 2015 (13 pages).

(Continued)

*Primary Examiner* — Nelson J Nieves
(74) *Attorney, Agent, or Firm* — Brandon V. Zuniga; James R. Gourley; Carstens & Cahoon, LLP (57) ABSTRACT

The present application provides a control method for a vehicle air conditioner, including: performing remote control in advance, wherein performing remote control in advance includes performing remote timing control in advance. Performing remote timing control in advance includes starting the air conditioner t0 minutes before the vehicle is started, so as to perform pre-cooling or pre-heating, wherein t0 is a constant. Compared with a vehicle air conditioner in the prior art, the vehicle air conditioner in (Continued)

the present application performs, by a configured step of performing remote control in advance, pre-cooling or pre-heating before the vehicle is started, so as to control an interior temperature of the vehicle in advance, such that when a user enters the vehicle, a comfortable ambient temperature is provided, thereby providing a comfortable ambient for a vehicle owner and a passenger.

19 Claims, 4 Drawing Sheets

(52) U.S. Cl.
CPC ..... *B60H 1/00735* (2013.01); *B60H 1/00878* (2013.01); *B60H 1/00985* (2013.01); *B60L 58/12* (2019.02)

(56) References Cited

U.S. PATENT DOCUMENTS

| | | | | |
|---|---|---|---|---|
| 2012/0305662 | A1* | 12/2012 | Miyano | H01M 10/615 236/44 C |
| 2013/0020864 | A1* | 1/2013 | Smajlovic | B60L 1/04 307/9.1 |
| 2013/0079978 | A1 | 3/2013 | Uyeki | |
| 2013/0122796 | A1* | 5/2013 | Lim | B60H 1/00278 454/75 |
| 2014/0088827 | A1 | 3/2014 | Yashiro et al. | |
| 2015/0097041 | A1* | 4/2015 | Hirabayashi | B60H 1/2218 237/28 |
| 2015/0099443 | A1* | 4/2015 | Hirabayashi | B60H 1/00657 454/75 |
| 2015/0102119 | A1* | 4/2015 | Hirabayashi | B60H 1/2218 237/28 |
| 2015/0191073 | A1 | 7/2015 | Björkerud et al. | |
| 2016/0193895 | A1* | 7/2016 | Aich | F24F 11/62 165/202 |
| 2016/0288621 | A1* | 10/2016 | Sakane | B60H 1/2218 |
| 2018/0086181 | A1* | 3/2018 | Connell | B60H 1/00657 |

FOREIGN PATENT DOCUMENTS

| | | |
|---|---|---|
| CN | 104105610 A | 10/2014 |
| CN | 104842743 A | 8/2015 |
| CN | 204674335 U | 9/2015 |
| CN | 105857011 A | 8/2016 |
| CN | 106240292 A | 12/2016 |
| CN | 106891773 A | 6/2017 |
| CN | 107745618 A | 3/2018 |
| DE | 10007195 A1 | 9/2001 |
| DE | 10326596 A1 | 11/2004 |
| DE | 102015213097 A1 | 1/2017 |
| FR | 2690387 A1 | 10/1993 |
| JP | 3896978 B2 | 3/2007 |
| JP | 2015074236 A | 4/2015 |
| KR | 20120130382 A | 12/2012 |

OTHER PUBLICATIONS

English translation of CN202283863U published on Jun. 27, 2012 (4 pages).
English translation of CN102447148 published on May 9, 2012 (5 pages).
International Search Report for Application No. PCT/CN2018/091356 dated Aug. 29, 2018 (2 pages).
Office Action for Chinese Application No. 201710811727.1 dated Jun. 5, 2019 (6 pages).
Extended European Search Report for European Application No. 18853413.5 dated Feb. 23, 2021 (13 pages).

* cited by examiner

CONTROL METHOD FOR VEHICLE AIR CONDITIONER

RELATED APPLICATION

This application is a U.S. National Stage of International Application No. PCT/CN2018/091356, filed on Jun. 14, 2018 and published as WO 2019/047585 on Mar. 14, 2019, which claims priority to the Chinese application No. 201710811727.1, titled "Control Method for Vehicle Air Conditioner", filed with the Chinese Patent Office on Sep. 11, 2017. Each application, publication, and patent listed in this paragraph are hereby incorporated by reference in their entireties.

TECHNICAL FIELD

The present application belongs to the technical field of an air conditioner, and in particular to a control method for a vehicle air conditioner.

BACKGROUND

There are two defects in the start-up control of the vehicle air conditioner of the traditional fuel vehicle. First, manual control is required inside the vehicle. Second, only after the vehicle is powered on and the engine is started, can the air conditioner be turned on. It is impossible to remotely turn on the air conditioner to pre-cool or preheat the air inside the vehicle, so the use comfort is not high for a user.

For a new energy vehicle, the air conditioning system and the engine system are independent of each other and are both powered by batteries. The compressor of the air conditioner can be turned on without being driven by the vehicle engine, therefore, in principle, the air conditioner can be turned on before the engine starts, so that the interior space of the vehicle can be pre-cooled and preheated. But no application is known.

Furthermore, the energy efficiency of the traditional vehicle air conditioner is low, and the power supply efficiency of the battery pack is also reduced under the condition of a low ambient temperature, thereby affecting the driving mileage. Especially in the air heating mode, the battery power is consumed too fast, because the efficiency of the battery is low under the low ambient temperature, and the hot air heating is based on positive temperature coefficient (PTC), therefore the heating efficiency is low. The full electric vehicle cannot provide engine waste heat for heating, and the traditional hot air heating based on PTC has low energy utilization efficiency, which makes the battery power consumption further increase under the low temperature ambient, therefore the electric vehicle in cold northern region in winter has a short driving time.

Moreover, since the operation of the air conditioner in the vehicle needs to consume electric energy, it is possible that the vehicle consumes electric power for cooling or heating, so that the electric power of the vehicle is lower than a safe range, and the vehicle cannot be used because the energy of the vehicle battery is out or too low to start.

The new energy vehicle air conditioner in the prior art cannot pre-cool or pre-heat the interior of the vehicle, which will cause the problems of low comfort for the user, low energy efficiency of the air conditioning system, low utilization efficiency of the battery, and low heating efficiency under the low ambient temperature, and cause the problems that the driving time is seriously affected, and that the vehicle cannot start as the energy of the vehicle battery is out or too low. Therefore, a new control method for the vehicle air conditioner is developed and designed in the present application.

SUMMARY

Therefore, the technical problem to be solved by the present application is to overcome the defects that the vehicle air conditioner in the prior art cannot pre-cool or preheat the interior of the vehicle, resulting in low use comfort for the user, and the present application provides a control method for the vehicle air conditioner.

The present application provides a control method for a vehicle air conditioner, including:

remote pre-control, comprising remote timing pre-control; wherein the remote timing pre-control comprises starting the air conditioner to pre-cool or pre-heat t0 minutes before the vehicle is started, and t0 is a constant.

Optionally, the remote timing pre-control further includes:

a detecting step of detecting an interior temperature Tin of the vehicle and an exterior temperature Tout of the vehicle;

a determining step of determining a relationship between Tin and Tout; and a performing step of selecting to start an exterior air circulation or start an interior air circulation directly according to the relationship determined; wherein, the interior air circulation means that air inside the vehicle circulates inside the vehicle and doesn't exchange with air outside the vehicle; the exterior air circulation means that the air outside the vehicle flows into the vehicle, and the air inside the vehicle exchanges with the air outside the vehicle.

Optionally, when the vehicle air conditioner is under a cooling working condition, the determining step comprises determining whether Tin>Tout+X1 is satisfied; and the performing step comprises, if Tin>Tout+X1 is satisfied, starting the exterior air circulation t1 minutes ahead of the predetermined time t0, then starting the interior air circulation of the air conditioner, and if Tin>Tout+X1 is not satisfied, starting the interior air circulation of the air conditioner directly without starting the exterior air circulation; wherein X1 and t1 are constants.

Optionally, a range of X1 is $1 \leq X1 \leq 6$; and a range of time t1 is $1 \leq t1 \leq 15$.

Optionally, when the vehicle air conditioner is under a heating working condition, the determining step comprises determining whether Tin<Tout−X2 is satisfied; and the performing step comprises, if Tin<Tout+X2 is satisfied, starting the exterior air circulation t2 minutes ahead of the predetermined time t0, then starting the interior air circulation of the air conditioner, and if Tin<Tout−X2 is not satisfied, starting the interior air circulation of the air conditioner directly without starting the exterior air circulation; wherein X2 and t2 are constants.

Optionally, a range of X2 is $2 \leq X2 \leq 6$, and a range of time t2 is $1 \leq t2 \leq 12$.

Optionally, the remote pre-control further includes remote intelligent temperature control, and the remote intelligent temperature control comprises:

a setting step of setting the interior temperature of the vehicle to reach Tset2 within a time t3;

a detecting step of detecting the interior temperature Tin of the vehicle;

a calculating step of calculating a minimum time t4 when the interior temperature of the vehicle reaches Tset2;

a determining step of judging a magnitude relationship between t3 and t4;

a performing step of controlling the air conditioner to operate according to the maximum output capacity operation mode when t3≤t4, and controlling the air conditioning system by selecting an optimal energy efficiency cooling/heating mode based on an embedded algorithm when t3>t4; and defining a time of temperature change of the air conditioning system to be t5 when the air conditioning system operates according to a highest energy efficiency operation mode; wherein t5≥t4, and the maximum output capacity operation mode is a mode, in which the air conditioner unit outputs a maximum capacity under a current working condition; and the highest energy efficiency operation mode is a mode, in which the air conditioner unit operating in the current working condition has a highest energy efficiency ratio.

Optionally, when t3≤t4, the calculating step further includes calculating a temperature value available in the vehicle within t3; and the control method further comprises a displaying step of displaying the available temperature value via a control panel or a mobile phone screen.

Optionally, the embedded algorithm comprises two cases which are classified according to a difference between the interior temperature of the vehicle and the exterior temperature of the vehicle when t3>t4, and t3<t5:

a. selecting an exterior air circulation mode and the maximum output capacity operation mode, if an interior of the vehicle is under a cooling working condition, and the exterior temperature of the vehicle is less than a difference between the interior temperature of the vehicle and a compensating temperature, or if the interior of the vehicle is under a heating working condition, and the exterior temperature of the vehicle is greater than a sum of the interior temperature of the vehicle and the compensating temperature; and b. selecting the maximum output capacity operation mode and the highest energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating working condition, and the exterior temperature of the vehicle is less than the sum of the interior temperature of the vehicle and the compensating temperature.

Optionally, in the case a, operating time is allocated as follows: first, the exterior air circulation operates for time (t3−t4)*k1, and the air conditioner operates according to the maximum output capacity operation mode for a remaining time, so that the interior temperature of the vehicle reaches a preset value in a preset time, wherein k1 is a correction factor which is given according to the interior temperature of the vehicle, the exterior temperature of the vehicle, and a temperature difference between the interior temperature of the vehicle and the exterior temperature of the vehicle.

Optionally, in the case b, an initial interior temperature of the vehicle is defined as T0, and an anticipated interior temperature of the vehicle is set to be Tset2; the air conditioning system first operates according to the maximum output capacity operation mode for tx1 minutes, then operates according to the highest energy efficiency operation mode for (t3−tx1) minutes.

Optionally, the tx1 is calculated by a linear operation based on the cooling/heating speed in the maximum output capacity operation mode and the cooling/heating speed in the highest energy efficiency operation mode; the cooling speed/heating speed in the maximum output capacity operation mode and the cooling speed/heating speed in the highest energy efficiency operation mode are respectively defined as v1 and v2;

when the interior of the vehicle is under the cooling working condition, T0−Tset2=v1*tx1+v2*(t3−tx1), that is, tx1=(T0−Tset2−v2*t3)/(v1−v2); and when the interior of the vehicle is under the heating working condition, Tset2−T0=v1*tx1+v2*(t3−tx1), that is, tx1=(Tset2−T0−v2*t3)/(v1−v2).

Optionally, the embedded algorithm further comprises two cases which are classified according to a difference between the interior temperature of the vehicle and the exterior temperature of the vehicle when t3≥t5:

c. selecting an exterior air circulation mode and the highest energy efficiency operation mode, if an interior of the vehicle is under a cooling working condition, and the exterior temperature of the vehicle is less than a difference between the interior temperature of the vehicle and a compensating temperature, or if the interior of the vehicle is under the heating working condition, and the exterior temperature of the vehicle is greater than a sum of the interior temperature of the vehicle and the compensating temperature; and d. selecting a minimum capacity operation mode and the highest energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating working condition, and the exterior temperature of the vehicle is less than the sum of the interior temperature of the vehicle and the compensating temperature; wherein, the minimum capacity operation mode refers to a mode, in which the air conditioner outputs the minimum capacity to maintain the interior temperature of the vehicle.

Optionally, in the case c, an operating time is allocated as follows: first, the exterior air circulation runs for time (t3−t5)*k2, and the air conditioner operates according to the highest energy efficiency operation mode for a remaining time, so that the interior temperature of the vehicle reaches a preset value in a preset time, wherein k2 is a correction factor which is given according to the interior temperature of the vehicle, the exterior temperature of the vehicle, and a temperature difference between the interior temperature of the vehicle and the exterior temperature of the vehicle.

Optionally, in the case d, an initial interior temperature of the vehicle is defined as T0, and an anticipated interior temperature of the vehicle is set to be Tset2; the air conditioning system first operates according to the highest energy efficiency operation mode for tx2 minutes, then operates according to the minimum capacity operation mode for (t3−tx2) minutes.

Optionally, tx2 is calculated by a linear arithmetic based on cooling/heating speed in the highest energy efficiency operation mode and cooling/heating speed in the minimum capacity operation mode; the cooling/heating speed in the highest energy efficiency operation mode and the cooling/heating speed in the minimum capacity operation mode are defined as v2 and v3 respectively;

when the interior of vehicle is under the cooling working condition, T0−Tset2=v2*tx2+v3*(t3−tx2), that is, tx2=(T0−Tset2−v3*t3)/(v2−v3); and when the interior of vehicle is under the heating working condition, Tset2−T0=v2*tx2+v3*(t3−tx2), that is, tx2=(Tset2−T0−v3*t3)/(v2−v3).

Optionally, the remote pre-control further comprises battery pack temperature pre-control, and the battery pack temperature pre-control includes:

a detecting step of automatically detecting whether a temperature of the battery pack of the vehicle is within an optimal power supply temperature range; and a performing step comprising, when the temperature of the battery pack is within the optimal power supply temperature range, not pre-controlling the battery pack, and when the temperature of the battery pack is not within the optimal power supply temperature range, controlling the temperature the battery pack in advance;

wherein the optimal power supply temperature range means that the battery pack with a temperature in this temperature range has the highest power supply efficiency.

Optionally, the optimal power supply temperature range of a new energy vehicle is defined as [Topt1, Topt2], and an actual battery pack temperature is Tbat; and including:

when Topt1≤Tbat≤Topt2, not pre-controlling the battery pack temperature;

when Tbat<Topt1, pre-heating the battery pack, so that the temperature of the battery pack of the vehicle reaches above Topt1 in a preset time; and when Topt2<Tbat, pre-cooling the battery pack, so that the temperature of the battery pack of the vehicle reaches below Topt1 in the preset time.

Optionally, the remote pre-control further includes a comprehensive control combining temperature control for the air conditioner and battery charging control.

Optionally, the comprehensive control includes: if the battery is fully charged when the air conditioner is remotely controlled, starting an air conditioning system according to a remote pre-control program, to adjust an interior temperature of the vehicle, and simultaneously continuing to charge the battery, so that the battery pack remains fully charged when the vehicle is used, and that the interior temperature of the vehicle is ensured to meet preset requirements.

Optionally, the comprehensive control comprises: if the battery is not fully charged when the air conditioner is remotely controlled, simultaneously evaluating a time tc1 required for fully charging the battery, a time tc2 required for adjusting an interior temperature of the vehicle to a preset temperature, an electric quantity Qc required for the remote pre-control for an air conditioning system, a time tc3 required to supplement consumed electric quantity, and a time difference tc4 between a time when control commands are sent to the air conditioner and a time to use the vehicle.

Optionally, when tc1+Max{tc2, tc3}≤tc4, first charging the battery to have electric quantity of Qa or more, then starting an energy-saving mode to adjust the interior temperature of the vehicle while the battery is charged continuously, so that the battery electric quantity remains full, and the interior temperature of the vehicle reaches a preset range when the vehicle is used; wherein Max{tc2, tc3} is a larger of tc2 and tc3.

Optionally, when tc1+Max{tc2, tc3}≥tc4, charging the battery preferably; and simultaneously, remotely feedbacking information that temperature control and battery charging cannot be performed at a same time, and telling an available regulated temperature Tn inside the vehicle and a ratio η of charged electric quantity to full electric quantity within a preset time.

Optionally, when the air conditioning system operates under a cooling working condition, cooling control modes of the air conditioner includes:

mode A: η≥a1, Tn≥b1;
mode B: a2≤η<a1, b2≤Tn<b1;
mode C: a3≤η<a2, b3≤Tn<b2;
mode D: η<a3, Tn<b3;

wherein a1<a2<a3; b1>b2>b3; a1, a2, a3, b1, b2 and b3 are all determined by the air conditioning system through calculating based on an actual temperature.

Optionally, when the air conditioning system operates under a heating working condition, heating control modes of the air conditioner includes:

Mode A': η≥a1', Tn<b1';
Mode B': a2'≤η<a1', b1'≤Tn<b2';
Mode C': a3'≤η<a2', b2'≤Tn<b3';
Mode D': η>a3', Tn≥b3';

wherein a1'<a2'<a3', b1'<b2'<b3', a1', a2', a3', b1', b2' and b3' are all determined by the air conditioning system through calculating based on an actual temperature.

The control method for the vehicle air conditioner provided by the present application has following beneficial effects:

1. In the control method for the vehicle air conditioner of the present application, by configuring remote pre-control steps, the air conditioner can pre-cool or pre-heat before the vehicle is started, so that the interior temperature of the vehicle can be controlled in advance and can reach a comfortable ambient temperature when the user enters the vehicle, thereby providing a comfortable environment for the driver and the passengers. The present application provides remote control and pre-control for the new energy vehicle air conditioner, which achieves the objective that the interior temperature of the vehicle reaches the preset comfortable state when the person reaches the vehicle.

2. In the control method for the vehicle air conditioner of the present application, the remote pre-control comprises a control mode combining the interior air circulation and the exterior air circulation, therefore the air outside the vehicle can be used effectively to realize an air exchange and a heat exchange with the air inside the vehicle interior, thereby increasing the overall energy efficiency of the air conditioning system efficiently.

3. In the control method for the vehicle air conditioner of the present application, the battery pack temperature can be pre-controlled simultaneously, so that the battery system can reach an optimal state before the user uses the vehicle, thereby improving the energy utilization efficiency of the battery, and improving the driving mileage. For example, in a cold region in winter, after the new energy vehicle is parked for a certain period of time, the battery pack temperature will be cooled to be a temperature equivalent to the ambient temperature (−15° C. or even lower). At this time, the battery power supply efficiency is lower than that at a normal temperature, if the vehicle is started immediately, the driving mileage will be reduced accordingly; if the battery pack temperature can be maintained in the temperature range of high-efficiency operating before the battery pack starts, the power supply efficiency can be improved, thereby extending the driving mileage.

4. In the control method for the vehicle air conditioner of the present application, when the battery is being charged, the interior temperature of the vehicle and the electric quantity of the battery pack can be pre-controlled at the same time. When the vehicle being charged receives the control commands for the air conditioner, the vehicle automatically calculates the time required for fully charging the battery, the time required for the temperature to reach the preset temperature set by the driver and the battery energy consumption, and the optimal control scheme is selected to ensure that the battery electric quantity remains full after the charging is completed, and that the interior temperature of the vehicle reaches the comfortable temperature range preset by the vehicle driver; the control for the air conditioner and the battery charging control are intelligently linked, and both of the battery charging control and the pre-control for the air conditioner are also considered, thereby ensuring the interior temperature of the vehicle and the electric quantity of the battery pack to be optimal at the same time.

DETAILED DESCRIPTION OF THE EMBODIMENTS

The First Embodiment

Figure 1:
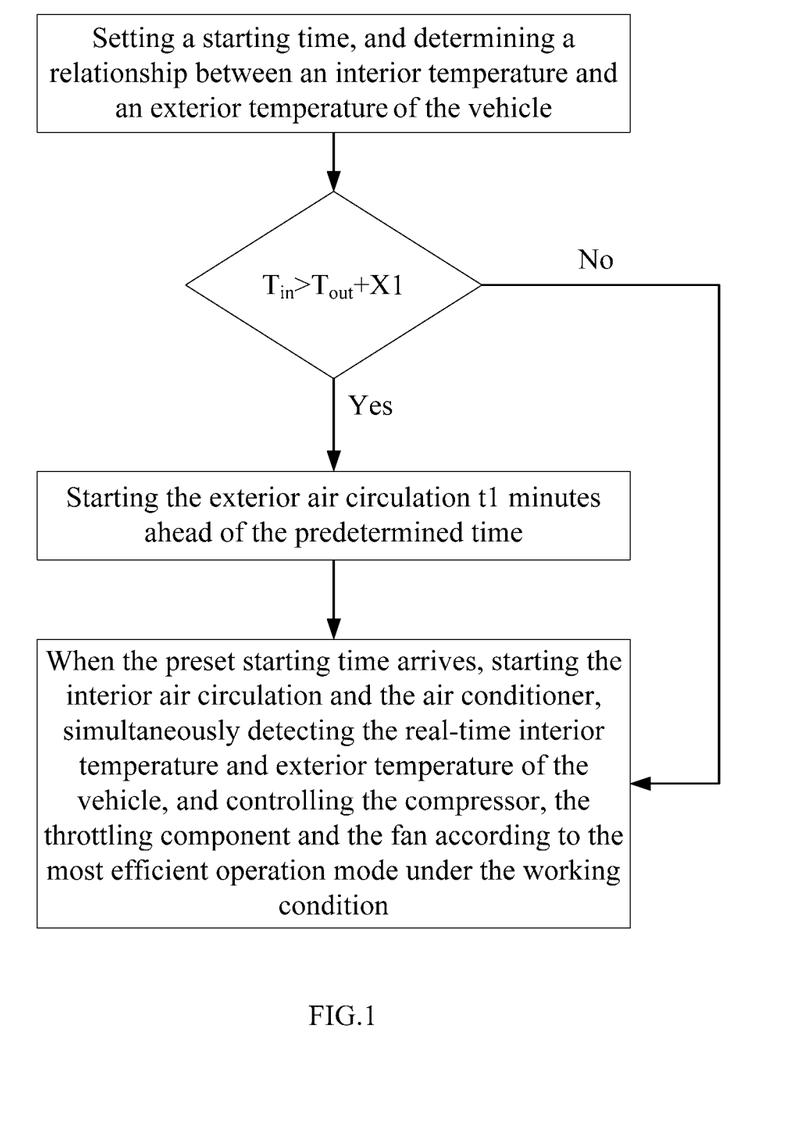
FIG. 1 is a schematic flow chart of a remote pre-control method for a vehicle air conditioner under a cooling condition of the present application.
Figure 2:
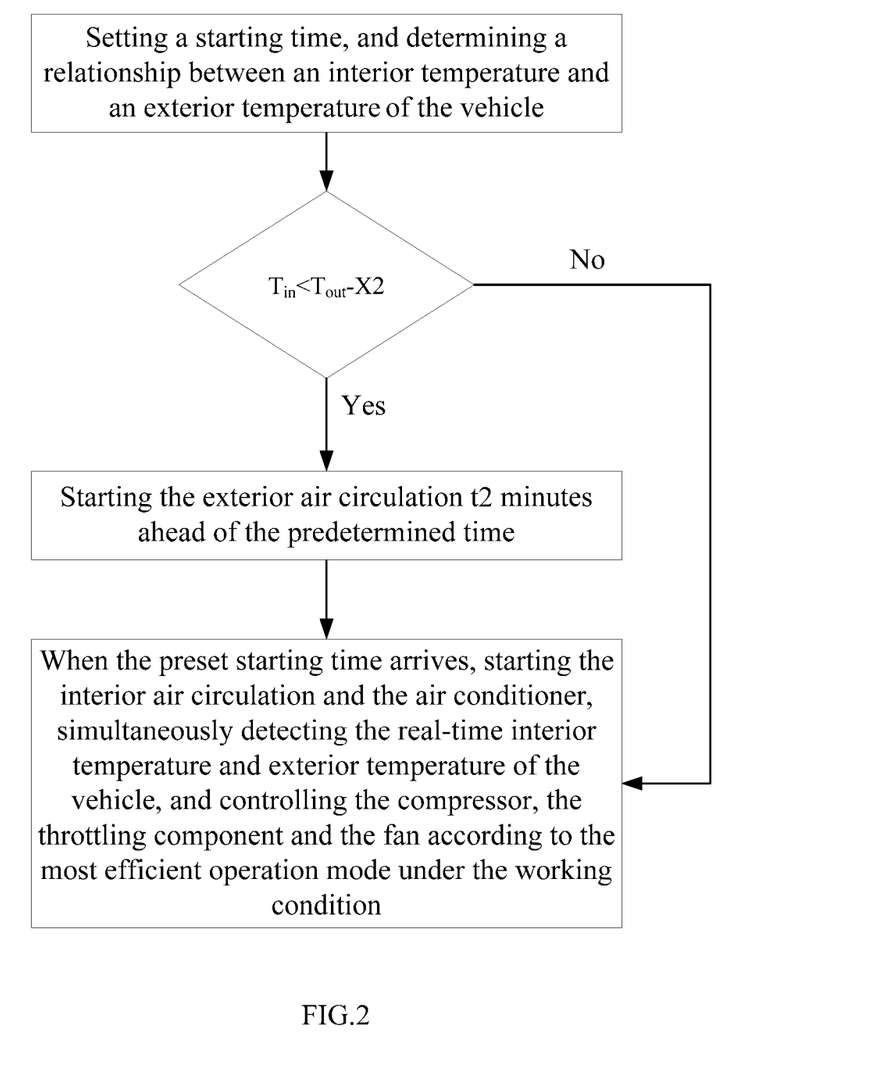
FIG. 2 is a schematic flow chart of a remote pre-control method for the vehicle air conditioner under a heating condition of the present application.

As shown in FIG. 1-2, the present application provides a control method for a vehicle air conditioner, which includes remote pre-control.

The remote pre-control includes remote timing pre-control, and the remote timing pre-control includes starting the air conditioner to pre-cool or pre-heat t0 minutes before the vehicle is started, where t0 is a constant.

The application provides the remote pre-control for a new energy vehicle air conditioner. the remote pre-control mainly includes remote timing pre-control and remote intelligent temperature control, and at the same time taking the temperature control of the battery pack into account. The remote pre-control means that, in a case that the passenger or the driver has not got on the vehicle yet, the driver can remotely turn on the air conditioner through an on-board air conditioner controller or a mobile phone APP (i.e., remote timing pre-control), or remotely configure a preset value of the interior temperature of the vehicle to be reached in a predetermined time (i.e., remote intelligent temperature control).

By setting the remote pre-control and configuring the remote timing pre-control steps in the remote pre-control, the air conditioner can pre-cool or pre-heat before the vehicle is started, so that the air interior temperature of the vehicle can be controlled in advance and can reach a comfortable ambient temperature when the user enters the vehicle, thereby providing a comfortable environment for the driver and the passengers. The present application provides remote control and pre-control for the new energy vehicle air conditioner, which achieves the objective that the interior temperature of the vehicle reaches the preset comfortable state when the person reaches the vehicle. In summer, the interior temperature of the vehicle is too high after the vehicle is exposed to the sun. When the vehicle user wants to use the vehicle, the vehicle user starts the door first for ventilation, and turns on the air conditioner at the same time, and waits for the interior temperature of the vehicle to decrease to be in an acceptable range. And the vehicle user in haste will have to tolerate the high temperature in the vehicle; and a similar case is also true in a cold winter. The interior space can be pre-cooled or pre-heated by remote pre-control for the vehicle air conditioner, so that the interior temperature of the vehicle can reach a preset human comfort temperature range in a preset time, thereby reducing the waiting time of the driver and the passengers, and improving the comfort.

Preferably, the remote timing pre-control further includes a combined control of interior and exterior air circulations, and the combined control includes:

a detecting step of detecting an interior temperature $T_{in}$ of the vehicle and an exterior temperature $T_{out}$ of the vehicle;

a determining step of determining a relationship between $T_{in}$ and $T_{out}$;

a performing step of selecting to start the exterior air circulation or start the interior air circulation directly according to the relationship determined; where, the interior air circulation means that the air inside the vehicle circulates inside the vehicle, and the air inside the vehicle does not exchange with the air outside the vehicle; the exterior air circulation means that the air outside the vehicle flows into the vehicle, and the air inside the vehicle exchanges with the air outside the vehicle.

In this way, the air outside the vehicle can be used effectively to realize an air exchange and a heat exchange with the air inside the vehicle interior, so that the air outside the vehicle can reduce or increase the temperature of the air inside the vehicle to meet the requirement. The exterior air circulation is started to exchange heat, thereby reducing the energy consumption of the air conditioning system and increasing the overall energy efficiency of the air conditioning system efficiently.

Optionally, when the vehicle air conditioner is under the cooling working condition:

the determining step includes determining whether $T_{in} > T_{out} + X1$ is satisfied;

the performing step comprises, if $T_{in} > T_{out} + X1$ is satisfied, starting the exterior air circulation t1 minutes ahead of the predetermined time to, then starting the interior air circulation of the air conditioner, and if $T_{in} > T_{out} + X1$ is not satisfied, starting the interior air circulation of the air conditioner directly without starting the exterior air circulation.

Where X1 and t1 are constants. This is a preferred control mode of combining the interior air circulation and the exterior air circulation under the cooling condition of the present application. When $T_{in} > T_{out} + X1$, it indicates that the interior temperature is higher than the exterior temperature by a certain value. By means of starting the interior air circulation exchanging with the exterior air circulation, the goal of reducing the interior temperature through cooling is realized. When the interior temperature of the vehicle cannot be reduced any more, start the interior air circulation, and then start the refrigerant circulation to reduce the temperature, thereby effectively utilizing the air outside the vehicle to transfer heat and reduce the temperature of the high temperature air inside the vehicle, and improving the energy efficiency of the air conditioner. When $T_{in} > T_{out} + X1$ is not satisfied, that is, $T_{in} < T_{out} + X1$ is satisfied, which indicates that the ambient interior temperature of the vehicle is lower than the ambient exterior temperature of the vehicle plus a compensation value, even if the air inside the vehicle and the air outside the vehicle are in communication, it is impossible for the air outside the vehicle to reduce the air interior temperature of the vehicle, so the interior air circulation of the air conditioner is directly started at this time.

In the case that the passenger does not reach, but the driver has arrived in the vehicle, the driver can set a starting time of the air conditioner through an air conditioner controller in the vehicle, that is, start the air conditioner at a preset time, or directly set the temperature of the vehicle to be reached at a certain time. The above operations can also be completed by remote control through an APP in a mobile phone, and the APP on the mobile phone has the functions of the controller in the vehicle.

Start the air conditioner at the preset time, namely, start the air conditioner unit at the predetermined time, then intelligently regulate the working condition of the air conditioner and the output capacity according to the interior temperature and the exterior temperature of the vehicle, and control the frequency of the compressor, the fan and the throttling component based on the most efficient operation mode under the working condition.

Set the preset temperature to be Tset1, the interior temperature of the vehicle to be $T_{in}$, and the exterior temperature of the vehicle to be $T_{out}$.

The timing control mode under the cooling condition is shown in FIG. 1. The interior air circulation means that the air inside the vehicle is circulated, and the air inside the vehicle does not exchange heat with the air outside the vehicle;

The exterior air circulation means that the air outside the vehicle enters the vehicle, and the air inside the vehicle exchanges heat with the air outside the vehicle;

In the remote timing pre-control mode, the highest energy efficiency operation mode refers to a mode, in which the air conditioner runs with the highest energy efficiency ratio under the current working condition; the mode is matched and established by the previous air conditioning system, and is realized by controlling the compressor frequency, the throttling component, the fan speed, and the on/off of the solenoid valve.

Preferably, the range of X1 is 1≤X1≤6; the range of time t1 is 1≤t1≤15.

These are the preferred range of the temperature compensation value X1 in the combined control mode of the interior air circulation and exterior air circulation of the present application, and the preferred range of the time t1 of starting the exterior air circulation in advance under the cooling condition, and these preferred ranges are obtained based on a large number of experimental and empirical values.

The detecting the interior temperature of the vehicle and the exterior temperature of the vehicle and starting the exterior air circulation under certain conditions herein are to cool inside of the vehicle via the temperature difference in the environment, thereby saving energy consumption of the air conditioner.

Preferably, when the vehicle air conditioner is under a heating working condition:

the determining step comprises determining whether $T_{in} < T_{out} - X2$ is satisfied;

the performing step comprises, if $T_{in} < T_{out} - X2$ is satisfied, starting the exterior air circulation t2 minutes ahead of the predetermined time t0, then starting the interior air circulation of the air conditioner, and if $T_{in} < T_{out} - X2$ is not satisfied, starting the interior air circulation of the air conditioner directly without starting the exterior air circulation.

Where X2 and t2 are constants. This is a preferred control mode of combining the interior air circulation and the exterior air circulation under the heating condition of the present application. When $T_{in} < T_{out} - X2$, it indicates that the interior temperature is lower than the exterior temperature by a certain value. By means of starting the interior air circulation exchanging with the exterior air circulation preferably, the goal of heating the interior of the vehicle to increase the temperature is realized. When the interior temperature of the vehicle cannot be increased any more, start the interior air circulation, and then start the refrigerant circulation to increase the temperature, thereby effectively utilizing the air outside the vehicle to transfer heat and increase the temperature of the low temperature air inside the vehicle, and improving the energy efficiency of the air conditioner. When $T_{in} < T_{out} - X2$ is not satisfied, that is, $T_{in} > T_{out} - X2$ is satisfied, it indicates that the ambient interior temperature of the vehicle is higher than the ambient exterior temperature of the vehicle minus a compensation value. Even if the air inside the vehicle and the air outside the vehicle are in communication, it is impossible for the air outside the vehicle to increase the temperature of air inside the vehicle, so the interior air circulation of the air conditioner is directly started at this time.

Preferably, the range of X2 is 2≤X2≤6; the range of time t2 is 1≤t2≤12. These are the preferred range of the temperature compensation value X2 in the combined control mode of the interior air circulation and the exterior air circulation of the present application, and the preferred range of the time t2 of starting the exterior air circulation in advance under the heating condition, and these preferred ranges are obtained based on a large number of experimental and empirical values.

The Second Embodiment

Figure 3:
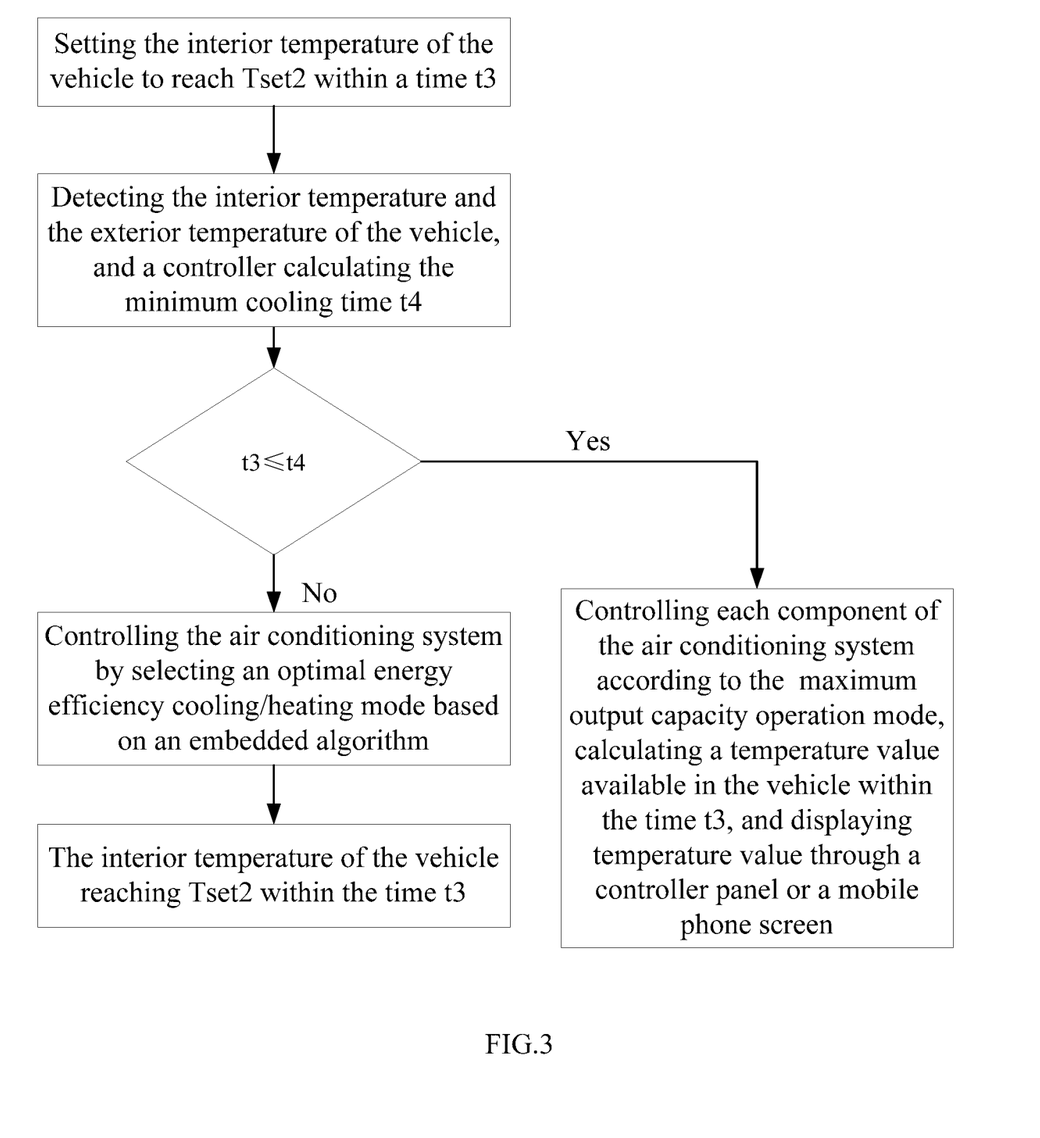
FIG. 3 is a schematic flow chart of a remote pre-control method including a remote temperature control for the vehicle air conditioner of the present application.

As shown in FIG. 3, this embodiment makes a further improvement on the basis of the first embodiment. Preferably, the remote pre-control further includes remote intelligent temperature control, and the remote intelligent temperature control includes:

a setting step of setting the interior temperature of the vehicle to reach Tset2 within a time t3;

a detecting step of detecting the interior temperature Tin of the vehicle;

a calculating step of calculating the minimum cooling time t4 (that is, the time t4 of the air conditioning system operating to cool according to the maximum output capacity operation mode) when the interior temperature of the vehicle reaches Tset2;

a determining step of determining a magnitude relationship between t3 and t4;

a performing step comprising, controlling the air conditioner to operate according to the maximum output capacity mode when t3≤t4, and controlling the air conditioning system by selecting an optimal energy efficiency cooling/heating mode according to the embedded algorithm when t3>t4.

Define a time of temperature change of the air conditioning system to be t5 when the air conditioning system operates according to a highest energy efficiency operation mode, where t5≥t4. The maximum output capacity operation mode is a mode, in which the air conditioner unit outputs the maximum capacity (including cooling capacity or heating capacity) under the current working condition. In the mode, the greatest temperature decreasing speed through cooling or the greatest temperature rising speed through heating in the vehicle is achieved. That is, this mode is also the shortest cooling time or heating time mode. The highest energy efficiency operation mode is a mode, in which the air conditioner unit operating in the current working condition has the highest energy efficiency ratio. The minimum capacity operation mode refers to a mode, in which the air conditioner unit needs to output the minimum capacity (including cooling capacity or heating capacity) to maintain the interior temperature of the vehicle. In the mode, the interior temperature of the vehicle remains unchanged.

This is the specific control step of the remote intelligent temperature control in the remote pre-control of the present application, which enables the air conditioning system to obtain the maximum output capability or the most efficient energy efficiency output capability. That is, when t3≤t4, t3 is the operating time set for the air conditioner, and it takes time t4 for the temperature to reach Tset2 in the maximum output capability operation mode. The interior temperature of the vehicle is not able to reach Tset2 even if the air conditioner operates according to the maximum output capability operation mode in the whole procedure, therefore, the operation of the air conditioner is controlled to operate according to the maximum output capacity operation mode, to make the interior temperature close to Tset2. When t3>t4, Tset2 can be achieved by the air conditioner operating according to the maximum output capacity operation mode for time t4, therefore, it is necessary to consider the energy efficiency of the air conditioning system at this time, and the optimal energy efficiency cooling/heating mode is selected to control the air conditioning system, thereby increasing the energy efficiency of the air conditioning system.

Except that the air conditioner can be started at the preset time (i.e., be remotely timing control in advance), the remote intelligent temperature control of the air conditioner can also be realized through the controller in the vehicle or through the APP on the mobile phone. That is, presetting the air conditioning unit enables the interior temperature of the vehicle to reach the preset value at in determined time.

In the remote intelligent temperature control mode, combining the interior temperature of the vehicle and the exterior temperature of the vehicle, the air conditioning system automatically adjusts the output capability according to the preset time and the preset temperature to be reached. The closed space in the vehicle is not too large, and the load of the air conditioner, the time required for cooling or heating can be calculated by the embedded algorithm matching with the air conditioning system in advance, and the optimal cooling/heating mode is selected, so that the interior temperature of the vehicle can reach the preset temperature within the preset time when the air conditioner operates according to the highest energy efficiency operation mode.

Preferably, when t3≤t4, the calculating step further includes calculating a temperature value available in the vehicle within the time t3.

The remote intelligent temperature control further includes a displaying step of displaying the available temperature value via a control panel or a mobile phone screen. In this way, even if the preset temperature cannot be obtained when the air conditioning system operates according to the maximum output capacity operation mode when t3≤t4, the temperature can approach the preset temperature value as much as possible. When the preset requirements cannot be met even if the air conditioner system operates in the maximum output capacity operation mode, the temperature is displayed through the controller panel, which, on one hand, reminds the user that the preset temperature value cannot be achieved, and displays the available temperature, on the other hand, tells the user the predicted time took by the interior temperature of the vehicle in the current state reaching the preset temperature, so that the user can configure the timing control for the preset temperature in advance next time.

In the remote intelligent temperature control mode, the air conditioner unit has three optional operating modes: the maximum output capacity operation mode, the highest energy efficiency operation mode, and the minimum capacity operation mode. The maximum output capacity operation mode is a mode, in which the air conditioner unit can output the maximum capacity (including cooling capacity or heating capacity) under the current working condition. In the mode, the greatest temperature decreasing speed through cooling or the greatest temperature rising speed through heating in the vehicle is achieved. That is, this mode is also the shortest cooling time or heating time mode. The highest energy efficiency operation mode is a mode, in which the air conditioner unit operating in the current working condition has the highest energy efficiency ratio. The minimum capacity operation mode refers to a mode, in which the air conditioner unit needs to output the minimum capacity (including cooling capacity or heating capacity) to maintain the interior temperature of the vehicle. In the mode, the interior temperature of the vehicle remains unchanged.

Preferably, the embedded algorithm includes: two cases which are classified according to a difference between the interior temperature of the vehicle and the exterior temperature of the vehicle when t3>t4, and t3<t5:

a. select the exterior air circulation mode and the maximum output capacity operation mode, if the interior of the vehicle is under the cooling working condition, and the exterior temperature of the vehicle is less than the difference between the interior temperature of the vehicle and the compensating temperature, or if interior of the vehicle is under the heating condition, and the exterior temperature of the vehicle is greater than the sum of the interior temperature of the vehicle and the compensating temperature;

b. select the maximum output capacity operation mode and the highest energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating condition, and the exterior temperature of the vehicle is less than the sum of the interior temperature of the vehicle and the compensating temperature, where the highest energy efficiency operation mode is a mode, in which the air conditioner unit operating in the current working condition has the highest energy efficiency ratio.

This is a preferred control method for the first case of the embedded algorithm in the remote intelligent temperature control of the present application, and the preferred control method can achieve the highest energy efficiency operation, that is, the optimal cooling mode is comprehensively selected according to the set cooling time, the current interior temperature of the vehicle and the current exterior temperature of the vehicle. The air conditioning system can calculate the cooling time according to the current interior temperature of the vehicle and the current exterior temperature of the vehicle, as shown in the control chart: assume that the cooling time is set to be t3, and the cooling time of the air conditioning system operating according to the maximum output capacity operation mode is t4, and the cooling time of the air conditioning system operating according to the highest energy efficiency operation mode is t5, where t5 The exterior temperature of the vehicle being less than the difference between the interior temperature of the vehicle and the compensating temperature indicates that the interior temperature is higher than the exterior temperature by a certain value. At this time, it is preferable to start the mode of the interior air circulation exchanging with the exterior air circulation, to achieve the goal of cooling the interior of the vehicle to reduce the temperature. When the interior temperature of the vehicle cannot be reduced any more, start the interior air circulation, and then start the refrigerant circulation to reduce the temperature, thereby effectively utilizing the air outside the vehicle to transfer heat and reduce the temperature of the high temperature air inside the vehicle, and improving the energy efficiency of the air conditioner. If the interior of the vehicle is under the heating condition, and the exterior temperature of the vehicle is greater than the sum of the interior temperature of the vehicle and the compensating temperature, it indicates that the interior temperature is lower than the exterior temperature by a certain value. At this time, it is preferable to start the mode of the interior air circulation exchanging with the exterior air circulation preferably, to achieve the goal of heating the interior of the vehicle to increase the temperature. When the interior temperature of the vehicle cannot be increased any more, start the interior air circulation, and then start the refrigerant circulation to increase the temperature, thereby effectively utilizing the air outside the vehicle to transfer heat and increase the temperature of the low temperature air inside the vehicle, and improving the energy efficiency of the air conditioner.

Preferably, in the case a, the operating time is allocated as follows: first, the exterior air circulation operates for time $(t3-t4)*k1$, and the air conditioner runs according to the maximum output capacity operation mode for the remaining time, where k1 is a correction factor which is given according to the interior temperature of the vehicle, the exterior temperature of the vehicle, and the temperature difference between the interior temperature of the vehicle and the exterior temperature of the vehicle. In this way, in the case a of the embedded algorithm, the control combining the exterior air circulation and the interior air circulation is performed, thereby realizing the control mode combining the maximum output capacity operation mode and the exterior air circulation mode.

Figure 4:
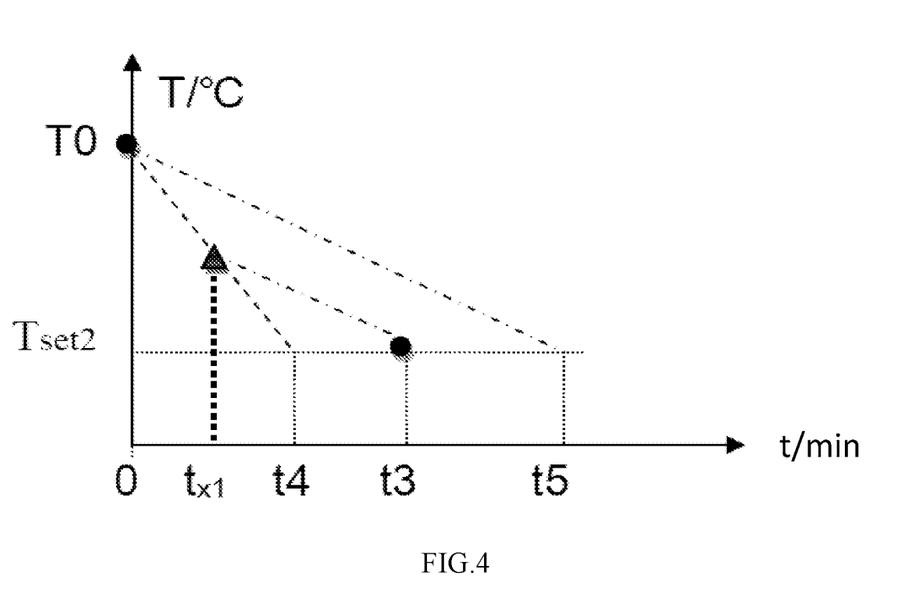
FIG. 4 is a schematic diagram illustrating change of temperature along with time in an embedded algorithm for the vehicle air conditioner of the present application.

Preferably, in the case b, an initial interior temperature of the vehicle is defined as T0, and the anticipated interior temperature of the vehicle is set to be Tset2 by the user. As shown in FIG. 4, the air conditioning system first operates according to the maximum output capacity operation mode for tx1 minutes, then operates according to the highest energy efficiency operation mode for (t3−tx1) minutes. This is the preferred control method for the case b (that is, the exterior air circulation cannot be performed, but only the interior air circulation can be performed) of the embedded algorithm in the remote intelligent temperature control of the present application, and the air conditioner operates partially according to the maximum output capacity operation mode and partially according to the highest energy efficiency operation mode, which can ensure that the interior temperature can reach the preset value and that the energy efficiency of the air conditioning system can be effectively improved.

As shown in FIG. 4, preferably, the tx1 is calculated by a linear arithmetic based on the cooling speed or the heating speed in the maximum output capacity operation mode and in the highest energy efficiency operation mode. The cooling speed or the heating speed in the maximum output capacity operation mode and in the highest energy efficiency operation mode are respectively defined as v1 and v2, then:

when the interior of the vehicle is under the cooling working condition, $T0-Tset2=v1*tx1+v2*(t3-tx1)$, that is, $tx1=(T0-Tset2-v2*t3)/(v1-v2)$;

when the interior of the vehicle is under the heating working condition, $Tset2-T0=v1*tx1+v2*(t3-tx1)$, that is, $tx1=(Tset2-T0-v2*t3)/(v1-v2)$.

This is a preferred calculating mode for tx1 of the present application, see FIG. 4.

Preferably, the embedded algorithm further includes two cases which are classified according to a difference between the interior temperature of the vehicle and the exterior temperature of the vehicle when $t3 \geq t5$:

c. select the exterior air circulation mode and the highest energy efficiency operation mode, if the interior of the vehicle is under the cooling working condition, and the exterior temperature of the vehicle is less than the difference between the interior temperature of the vehicle and the compensating temperature, or if the interior of the vehicle is under the heating working condition, and the exterior temperature of the vehicle is greater than the sum of the interior temperature of the vehicle and the compensating temperature;

d. select the minimum capacity operation mode and the highest energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating condition, and the exterior temperature of the vehicle is less than the sum of the interior temperature of the vehicle and the compensating temperature. The minimum capacity operation mode refers to a mode, in which the air conditioner outputs the minimum capacity (including cooling capacity or heating capacity) to maintain the interior temperature of the vehicle. In the mode, the interior temperature of the vehicle remains unchanged.

This is a preferred control method for the second case of the embedded algorithm in the remote intelligent temperature control of the present application, and the preferred control method can achieve the highest energy efficiency operation, that is, the optimal cooling mode is comprehensively selected according to the set cooling time, the current interior temperature of the vehicle and the current exterior temperature of the vehicle. The air conditioning system can calculate the cooling time according to the current interior temperature of the vehicle and the current exterior temperature of the vehicle, as shown in the control chart: assume that the cooling time is set to be t3, and the cooling time of the air conditioning system operating according to the maximum output capacity operation mode is t4, and the cooling time of the air conditioning system operating according to the highest energy efficiency operation mode is t5, where $t5 \geq t4$. The exterior temperature of the vehicle being less than the difference between the interior temperature of the vehicle and the compensating temperature indicates that the interior temperature is higher than the exterior temperature by a certain value. At this time, it is preferable to start the mode of the interior air circulation exchanging with the exterior air circulation, to achieve the goal of cooling the interior of the vehicle to reduce the temperature. When the interior temperature of the vehicle cannot be reduced any more, start the interior air circulation, and then start the refrigerant circulation to reduce the temperature, thereby effectively utilizing the air outside the vehicle to transfer heat and reduce the temperature of the high temperature air inside the vehicle, and improving the energy efficiency of the air conditioner. If the interior of the vehicle is under the heating condition, and the exterior temperature of the vehicle is greater than the sum of the interior temperature of the vehicle and the compensating temperature, it indicates that the interior temperature is lower than the exterior temperature by a certain value. At this time, it is preferable to start the mode of the interior air circulation exchanging with the exterior air circulation, to achieve the goal of heating the interior of the vehicle to increase the temperature. When the interior temperature of the vehicle cannot be increased any more, start the interior air circulation, and then start the refrigerant circulation to increase the temperature, thereby effectively utilizing the air outside the vehicle to transfer heat and increase the temperature of the low temperature air inside the vehicle, and improving the energy efficiency of the air conditioner.

Preferably, in the case c, the operating time is allocated as follows: first, the exterior air circulation runs for time (t3−t5)*k2, and the air conditioner operates according to the highest energy efficiency operation mode for the remaining time, where k2 is a correction factor which is given according to the interior temperature of the vehicle, the exterior temperature of the vehicle, and the temperature difference between the interior temperature of the vehicle and the exterior temperature of the vehicle. In this way, in the case c of the embedded algorithm, the control combining the exterior air circulation and the interior air circulation is performed, thereby realizing the control mode combining the highest energy efficiency operation mode and the exterior air circulation.

Preferably, in the case d, the initial interior temperature of the vehicle is defined as T0, and the anticipated interior temperature of the vehicle set by the user is Tset2. The air conditioning system first operates according to the highest energy efficiency operation mode for tx2 minutes, and then runs according to the minimum capacity operation mode for (t3−tx2) minutes. This is the preferred control method for the case d (that is, the exterior air circulation cannot be performed, but only the interior air circulation can be performed) of the embedded algorithm in the remote intelligent temperature control of the present application, and the air conditioner operates partially according to the minimum capacity operation mode and partially according to the highest energy efficiency operation mode, which can ensure that the interior temperature can reach the preset value and that the energy efficiency of the air conditioning system can be effectively improved.

Preferably, the tx2 is calculated by a linear arithmetic based on the cooling speed or the heating speed in the highest energy efficiency operation mode and in the minimum capacity operation mode. The cooling speed or the heating speed in the highest energy efficiency operation mode and the minimum capacity operation mode are defined as v2 and v3 respectively, then:

when the interior of vehicle is under the cooling working condition, T0−Tset2=v2*tx2+v3*(t3−tx2), that is, tx2=(T0−Tset2−v3*t3)/(v2−v3);

when the interior of vehicle is under the heating working condition, Tset2−T0=v2*tx2+v3*(t3−tx2), that is, tx2=(Tset2−T0−v3*t3)/(v2−v3).

This is the preferred calculating mode for tx2 of the present application. The remote intelligent temperature control can meet the customer's requirements more accurately, and can provide quantifiable indicators for the comfort of the interior temperature. Moreover, the air conditioning system control scheme with the highest efficiency is selected by the remote intelligent temperature control combining the interior heating mode or cooling mode, thereby saving the electricity consumption of the air conditioner.

The Third Embodiment

This embodiment makes a further improvement based on the first embodiment and the second embodiment. When the new energy vehicle is provided with a battery pack thermal management system, the remote pre-control further includes battery pack temperature pre-control, and the battery pack temperature pre-control includes:

a detecting step, automatically detecting whether the temperature of the battery pack of the vehicle is within an optimal power supply temperature range;

a performing step comprising, when the temperature of the battery pack is within the optimal power supply temperature range, not pre-controlling the battery pack temperature; when the temperature of the battery pack is not within the optimal power supply temperature range, controlling the temperature the battery pack in advance.

Where the optimal power supply temperature range means that the battery pack in this temperature range has the highest power supply efficiency.

If the new energy vehicle is provided with the battery pack thermal management system, and when the driver performs a remote pre-control, the remote pre-control method can automatically detect whether the temperature of the battery pack is within the optimal power supply temperature range. When the temperature of the battery pack is within the optimal power supply temperature range, the battery pack is not pre-controlled; when the battery pack temperature is not within the optimal power supply temperature range, the battery pack needs to be pre-controlled. In the present application, the air conditioner is controlled in advance to regulate the temperature, and simultaneously, the battery pack temperature is pre-controlled, so that the battery system can be in the optimal state before the user uses the vehicle, thereby improving the energy utilization efficiency of the battery, and improving the driving mileage. For example, in a cold region in winter, after the new energy vehicle is parked for a certain period of time, the battery pack temperature will be cooled to be a temperature equivalent to the ambient temperature (−15° C. or even lower). At this time, the battery power supply efficiency is lower than that at a normal temperature, if the vehicle is started immediately, the driving mileage will be reduced accordingly; if the battery pack temperature can be maintained in the temperature range of high-efficiency operating before the battery pack starts, the power supply efficiency can be improved, thereby extending the driving mileage.

Preferably, the optimal power supply temperature range of a new energy vehicle is defined as [Topt1, Topt2], and the actual battery pack temperature is Tbat, and when Topt1≤Tbat≤Topt2, do not pre-control the battery pack temperature;

when Tbat<Topt1, pre-heat the battery pack, so that the temperature of the battery pack of the vehicle reaches above Topt1 in the preset time;

when Topt2<Tbat, pre-cool the battery pack, so that the temperature of the battery pack of the vehicle reaches below Topt1 in the preset time.

This is the specific determining and control method for the pre-control of the battery pack temperature included in the remote pre-control for the vehicle of the present application.

The Fourth Embodiment

This embodiment makes a further improvement based on the embodiments 1-3. Preferably, the remote pre-control of this embodiment further includes a comprehensive control combining the temperature control for the air conditioner and the battery charging control when the vehicle is being charged. When the battery is being charged, the interior temperature of the vehicle and the electric quantity of the battery pack can be pre-controlled at the same time. When the vehicle being charged receives the control commands for the air conditioner, the vehicle automatically calculates the time required for fully charging the battery, the time required for the temperature to reach the preset temperature set by the driver and the battery energy consumption, and the optimal control scheme is selected to ensure that the battery electric quantity is full after the charging is completed, and that the interior temperature of the vehicle reaches the comfortable temperature range preset by the vehicle driver; the control for the air conditioner and the battery charging control are intelligently linked, and both of the battery charging control and the pre-control for the air conditioner are also considered, thereby ensuring the interior temperature of the vehicle and the electric quantity of the battery pack to be optimal at the same time.

Specifically, two control modes are provided. Preferably and first, if the battery is fully charged when the air conditioner is remotely controlled, then start the air conditioning system according to a remote pre-control program, to adjust the interior temperature of the vehicle, and simultaneously continue to charge the battery, so that the battery pack remains fully charged when the user uses the vehicle, and the interior temperature of the vehicle is ensured to meet the preset requirements of the driver.

Preferably and second, if the battery is not fully charged when the air conditioner is remotely controlled, it is necessary to simultaneously evaluate the time tc1 required for fully charging the battery, the time tc2 required for adjusting the interior temperature of the vehicle to the preset temperature, the electric quantity Qc required for the pre-control for the air conditioning system, the time tc3 required to supplement the consumed electric quantity, and the time difference tc4 between the time when the driver sends the control commands for the air conditioner and the time when the driver plans to use the vehicle. At this time, it is preferred to ensure that the electric quantity of the vehicle battery reaches a certain amount electric quantity of Qa or more, then start the air conditioner to control the interior temperature of the vehicle. Where the range of Qa is from 75% to 100% of the total electric quantity.

Preferably, when there is sufficient time for the air conditioner to control the temperature, and there is sufficient time to charge the battery, that is, when tc1+Max{tc2, tc3}≤tc4, first the battery is charged to have electric quantity of Qa or more, where the range of Qa is from 75% to 100% of the total battery electric quantity, then start the energy-saving mode to adjust the interior temperature of the vehicle while the battery is charged continuously (where the energy-saving mode refers to the mode, in which the compressor, the fan and other motors have the highest efficiency, and the heat exchanging efficiency of the heat exchanger in the air conditioning system is the highest), so that the battery electric quantity remains full, and the interior temperature of the vehicle reaches the preset range when the driver uses the vehicle; where Max{tc2, tc3} is the larger of tc2 and tc3; when tc2≥tc3, then Max{tc2,tc3}=tc2; when tc2<tc3, then Max{tc2,tc3}=tc3.

Preferably, when tc1+Max{tc2, tc3}≥tc4, that is, when there is insufficient time for the air conditioner to control the temperature and insufficient time to charge the battery, the battery is charged preferably. Since the operation of the air conditioner needs to consume the battery electric quantity, it is necessary to reduce the electric quantity consumed by the air conditioner in the vehicle, and simultaneously, to remotely feedback the information to the user that temperature control and battery charging cannot be performed at the same time, and note the user the available regulated temperature Tn inside the vehicle and the ratio η (η≤1) of the charged electric quantity to the full electric quantity within the preset time.

Preferably, four modes are provided for the user to select. Taking the cooling mode as an example, the specific control method is as follows: when the air conditioning system operates under the cooling working condition, the cooling control modes of the air conditioner includes:

mode A: η≥a1, Tn≥b1;
mode B: a2≤η<a1, b2≤Tn<b1;
mode C: a3≤η<a2, b3≤Tn<b2;
mode D: η<a3, Tn<b3;

where a1<a2<a3; b1>b2>b3; a1, a2, a3, b1, b2, and b3 are all determined by the air conditioning system through calculating based on the actual temperature. These are four preferred modes under the cooling condition of the present invention, and when neither of the time for controlling the temperature and the time for charging the battery are sufficient, where 11 and Tn have a monotonic relationship, because the larger the remaining electric quantity, the larger the η less the electric quantity consumption, the less the cooling effect, and the higher the temperature; and the smaller the remaining electric quantity, the smaller the η larger the electric quantity consumption, the larger cooling effect, and the lower the temperature.

Taking the heating mode as an example, the specific control method is as follows: when the air conditioning system operates under the heating working condition, the heating control modes of the air conditioner includes:

Mode A': η≥a1', Tn<b1';
Mode B': a2'≤η<a1', b1'≤Tn<b2';
Mode C': a3'≤η<a2', b2'≤Tn<b3';
Mode D': η<a3', Tn≥b3';

where a1'<a2'<a3', b1'<b2'<b3', a1', a2', a3', b1', b2', b3' are all determined by the air conditioning system through calculating based on the actual temperature. These are four preferred modes under the heating condition of the present invention, and when neither of the time for controlling the temperature and the time for charging the battery are sufficient, where 11 and Tn have a monotonic relationship, because the larger the remaining electric quantity, the larger the η, less the electric quantity consumption, the less the heating effect, and the lower the temperature; and the smaller the remaining electric quantity, the smaller the η, larger the electric quantity consumption, the larger the heating effect, and the higher the temperature.

What described above are preferred embodiments of the present invention, and they are not intended to limit the scope of the present invention. Various modifications, equivalent substitutions and improvements can be made without departing from the sprits and principles of the present invention, and all these modifications, equivalent substitutions and improvements are within the scope of the present invention. It will be understood by those skilled in the art that various modifications and improvements can be made without departing from the technical principles of the present invention, and all these modifications and improvements are within the scope of the present invention.

What is claimed is:

1. A control method for a vehicle air conditioner, comprising:

remote pre-control, comprising remote timing pre-control; wherein the remote timing pre-control comprises starting the air conditioner to pre-cool or pre-heat for a predetermined time of t0 minutes before the vehicle is started, and t0 is a constant;

the remote pre-control further comprises remote intelligent temperature control, and the remote intelligent temperature control comprises:

a setting step of setting the interior temperature of the vehicle to reach Tset2 within a time t3;

a detecting step of detecting the interior temperature Tin of the vehicle;

a calculating step of calculating a minimum time t4 when the interior temperature of the vehicle reaches Tset2, a determining step of judging a magnitude relationship between t3 and t4;

a performing step of controlling the air conditioner to operate according to the maximum output capacity operation mode when t3≤t4, and controlling the air conditioning system by selecting an optimal energy efficiency cooling or heating mode based on an embedded algorithm when t3>t4; and defining a time of temperature change of the air conditioning system to be t5 when the air conditioning system operates according to a maximum energy efficiency operation mode; wherein t5≥t4, and the maximum output capacity operation mode in which the air conditioner unit outputs a maximum capacity under a current working condition, and the maximum energy efficiency operation mode is a mode in which the air conditioner unit operating in the current working condition has a maximum energy efficiency ratio.

2. The control method for the vehicle air conditioner according to claim 1, wherein, the remote timing pre-control further comprises:

a detecting step of detecting an interior temperature Tin of the vehicle and an exterior temperature Tout of the vehicle;

a determining step of determining a relationship between Tin and Tout; and a performing step of selecting to start an exterior air circulation or start an interior air circulation directly according to the relationship determined; wherein, the interior air circulation means that air inside the vehicle circulates inside the vehicle and doesn't exchange with air outside the vehicle; the exterior air circulation means that the air outside the vehicle flows into the vehicle, and the air inside the vehicle exchanges with the air outside the vehicle.

3. The control method for the vehicle air conditioner according to claim 2, wherein, when the vehicle air conditioner is under a cooling working condition, the determining step comprises determining whether Tin>Tout+X1 is satisfied; and the performing step comprises, if Tin>Tout+X1 is satisfied, starting the exterior air circulation t1 minutes ahead of the predetermined time of t0 minutes, then starting the interior air circulation of the air conditioner, and if Tin>Tout+X1 is not satisfied, starting the interior air circulation of the air conditioner directly without starting the exterior air circulation;

wherein X1 and t1 are constants.

4. The control method for the vehicle air conditioner according to claim 3, wherein, a range of X1 is 1≤X1≤6; and a range of time t1 is 1≤t1≤15.

5. The control method for the vehicle air conditioner according to claim 2, wherein, when the vehicle air conditioner is under a heating working condition, the determining step comprises determining whether Tin<Tout−X2 is satisfied; and the performing step comprises, if Tin<Tout+X2 is satisfied, starting the exterior air circulation t2 minutes ahead of the predetermined time of t0 minutes, then starting the interior air circulation of the air conditioner, and if Tin<Tout−X2 is not satisfied, starting the interior air circulation of the air conditioner directly without starting the exterior air circulation;

wherein X2 and t2 are constants.

6. The control method for the vehicle air conditioner according to claim 5, wherein, a range of X2 is 2≤X2≤2 and a range of time t1 is 1≤t2≤12.

7. The control method for the vehicle air conditioner according to claim 1, wherein: when t3≤t4, the calculating step further comprises calculating a temperature value available in the vehicle within t3, and the control method further comprises a displaying step of displaying the available temperature value via a control panel or a mobile phone screen;

when t3>t4, and t3<t5, the embedded algorithm comprises two cases which are classified according to a difference between the interior temperature of the vehicle and the exterior temperature of the vehicle:

case a. selecting an exterior air circulation mode and the maximum output capacity operation mode, if an interior of the vehicle is under a cooling working condition, and the exterior temperature of the vehicle is less than a difference between the interior temperature of the vehicle and a compensating temperature, or if the interior of the vehicle is under a heating working condition, and the exterior temperature of the vehicle is greater than a sum of the interior temperature of the vehicle and the compensating temperature; and case b. selecting the maximum output capacity operation mode and the maximum energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating working condition, and the exterior temperature of the vehicle is less than the sum of the interior temperature of the vehicle and the compensating temperature;

when t3≥t5, the embedded algorithm further comprises two cases which are classified according to a difference between the interior temperature of the vehicle and the exterior temperature of the vehicle:

case c. selecting an exterior air circulation mode and the maximum energy efficiency operation mode, if an interior of the vehicle is under a cooling working condition, and the exterior temperature of the vehicle is less than a difference between the interior temperature of the vehicle and a compensating temperature, or if the interior of the vehicle is under the heating working condition, and the exterior temperature of the vehicle is greater than a sum of the interior temperature of the vehicle and the compensating temperature; and case d. selecting a minimum capacity operation mode and the maximum energy efficiency operation mode, if the interior of the vehicle is under the cooling working condition, and the exterior temperature of the vehicle is greater than the difference between the interior temperature of the vehicle and the compensating temperature, or if the interior of the vehicle is under the heating working condition, and the exterior temperature of the vehicle is less than the sum of the interior temperature of the vehicle and the compensating temperature; wherein, the minimum capacity operation mode refers to a mode in which the air conditioner outputs the minimum capacity to maintain the interior temperature of the vehicle.

8. The control method for the vehicle air conditioner according to claim 7, wherein, in the case a, operating time is allocated as follows: first, the exterior air circulation operates for time $(t3-t4)*k1$, and the air conditioner operates according to the maximum output capacity operation mode for a remaining time, so that the interior temperature of the vehicle reaches a preset value in a preset time, wherein k1 is a correction factor which is given according to the interior temperature of the vehicle, the exterior temperature of the vehicle, and a temperature difference between the interior temperature of the vehicle and the exterior temperature of the vehicle;

in the case b, an initial interior temperature of the vehicle is defined as T0, and an anticipated interior temperature of the vehicle is set to be Tset2; the air conditioning system first operates according to the maximum output capacity operation mode for tx1 minutes, then operates according to the maximum energy efficiency operation mode for (t3−tx1) minutes;

in the case c, an operating time is allocated as follows: first, the exterior air circulation runs for time $(t3-t5)*k2$, and the air conditioner operates according to the maximum energy efficiency operation mode for a remaining time, so that the interior temperature of the vehicle reaches a preset value in a preset time, wherein k2 is a correction factor which is given according to the interior temperature of the vehicle, the exterior temperature of the vehicle, and a temperature difference between the interior temperature of the vehicle and the exterior temperature of the vehicle;

in the case d, an initial interior temperature of the vehicle is defined as T0, and an anticipated interior temperature of the vehicle is set to be Tset2; the air conditioning system first operates according to the maximum energy efficiency operation mode for tx2 minutes, then operates according to the minimum capacity operation mode for (t3−tx2) minutes.

9. The control method for the vehicle air conditioner according to claim 8, wherein, the tx1 is calculated by a linear operation based on the cooling or heating speed in the maximum output capacity operation mode and the cooling or heating speed in the maximum energy efficiency operation mode; the cooling speed or heating speed in the maximum output capacity operation mode and the cooling speed or heating speed in the maximum energy efficiency operation mode are respectively defined as v1 and v2;

when the interior of the vehicle is under the cooling working condition, $T0-Tset2=v1*tx1+v2*(t3-tx1)$, that is, $tx1=(T0-Tset2-v2*t3)/(v1-v2)$; and when the interior of the vehicle is under the heating working condition, $Tset2-T0=v1*tx1+v2*(t3-tx1)$, that is, $tx1=(Tset2-T0-v2*t3)/(v1-v2)$.

10. The control method for the vehicle air conditioner according to claim 8, wherein, tx2 is calculated by a linear arithmetic based on cooling, or heating speed in the maximum energy efficiency operation mode and cooling or heating speed in the minimum capacity operation mode; the cooling or heating speed in the maximum energy efficiency operation mode and the cooling or heating speed in the minimum capacity operation mode are defined as v2 and v3 respectively;

when the interior of vehicle is under the cooling working condition, $T0-Tset2=v2*tx2+v3*(t3-tx2)$, that is, $tx2=(T0-Tset2-v3*t3)/(v2-v3)$; and when the interior of vehicle is under the heating working condition, $Tset2-T0=v2*tx2+v3*(t3-tx2)$, that is, $tx2=(Tset2-T0-v3*t3)/(v2-v3)$.

11. The control method for the vehicle air conditioner according to claim 1, wherein, the remote pre-control further comprises battery pack temperature pre-control, and the battery pack temperature pre-control comprises:

a detecting step of automatically detecting whether a temperature of the battery pack of the vehicle is within an optimal power supply temperature range; and a performing step comprising, when the temperature of the battery pack is within the optimal power supply temperature range, not pre-controlling the battery pack, and when the temperature of the battery pack is not within the optimal power supply temperature range, controlling the temperature the battery pack in advance;

wherein the optimal power supply temperature range means that the battery pack with a temperature in this temperature range has the maximum power supply efficiency.

12. The control method for the vehicle air conditioner according to claim 11, wherein, the optimal power supply temperature range of a new energy vehicle is defined as [Topt1, Topt2], and an actual battery pack temperature is Tbat; and comprising:

when $Topt1 \leq Tbat \leq Topt2$, not pre-controlling the battery pack temperature;

when $Tbat<Topt1$, pre-heating the battery pack, so that the temperature of the battery pack of the vehicle reaches above Topt1 in a preset time; and when $Topt2<Tbat$, pre-cooling the battery pack, so that the temperature of the battery pack of the vehicle reaches below Topt1 in the preset time.

13. The control method for the vehicle air conditioner according to claim 1, wherein, the remote pre-control further comprises a comprehensive control combining temperature control for the air conditioner and battery charging control.

14. The control method for the vehicle air conditioner according to claim 13, wherein, the comprehensive control comprises: if the battery is fully charged when the air conditioner is remotely controlled, starting an air conditioning system according to a remote pre-control program, to adjust an interior temperature of the vehicle, and simultaneously continuing to charge the battery, so that the battery pack remains fully charged when the vehicle is used, and that the interior temperature of the vehicle is ensured to meet preset requirements.

15. The control method for the vehicle air conditioner according to claim 13, wherein, the comprehensive control comprises: if the battery is not fully charged when the air conditioner is remotely controlled, simultaneously evaluating a time tc1 required for fully charging the battery, a time tc2 required for adjusting an interior temperature of the vehicle to a preset temperature, an electric quantity Qc required for the remote pre-control for an air conditioning system, a time tc3 required to supplement consumed electric quantity, and a time difference tc4 between a time when control commands are sent to the air conditioner and a time to use the vehicle.

16. The control method for the vehicle air conditioner according to claim 15, comprising, when tc1+Max{tc2, tc3}≤tc4, first charging the battery to have electric quantity of Qa or more, then starting an energy-saving mode to adjust the interior temperature of the vehicle while the battery is charged continuously, so that the battery electric quantity remains full, and the interior temperature of the vehicle reaches a preset range when the vehicle is used; wherein Max{tc2, tc3} is a larger of tc2 and tc3.

17. The control method for the vehicle air conditioner according to claim 15, comprising, when tc1+Max{tc2, tc3}≥tc4, charging the battery preferably; and simultaneously, remotely feedbacking information that temperature control and battery charging cannot be performed at a same time, and telling an available regulated temperature Tn inside the vehicle and a ratio $\eta$ of charged electric quantity to full electric quantity within a preset time.

18. The control method for the vehicle air conditioner according to claim 17, wherein, when the air conditioning system operates under a cooling working condition, cooling control modes of the air conditioner comprise:

mode A: $\eta \geq a1$, $Tn \geq b1$;
mode B: $a2 \leq \eta < a1$, $b2 \leq Tn < b1$;
mode C: $a3 \leq \eta < a2$, $b3 \leq Tn < b2$;
mode D: $\eta < a3$, $Tn < b3$;
wherein $a1 < a2 < a3$; $b1 > b2 > b3$; a1, a2, a3, b1, b2 and b3 are all determined by the air conditioning system through calculating based on an actual temperature.

19. The control method for the vehicle air conditioner according to claim 17, wherein, when the air conditioning system operates under a heating working condition, heating control modes of the air conditioner comprise:

Mode A': $\eta \geq a1'$, $Tn < b1'$;
Mode B': $a2' \leq \eta < a1'$, $b1' \leq Tn < b2'$;
Mode C': $a3' \leq \eta < a2'$, $b2' \leq Tn < b3'$;
Mode D': $\eta < a3'$, $Tn \geq b3'$;
wherein $a1' < a2' < a3'$, $b1' < b2' < b3'$, a1', a2', a3', b1', b2' and b3' are all determined by the air conditioning system through calculating based on an actual temperature.

\* \* \* \* \*

UNITED STATES PATENT AND TRADEMARK OFFICE
CERTIFICATE OF CORRECTION

PATENT NO. : 11,179,997 B2
APPLICATION NO. : 16/645963
DATED : November 23, 2021
INVENTOR(S) : Youlin Zhang, Huan Zhao and Jun Shen It is certified that error appears in the above-identified patent and that said Letters Patent is hereby corrected as shown below:

In the Specification

In Column 19, Line 27, replace "operation mode in which" with --operation mode is a mode in which--.

In Column 19, Line 29, replace "condition, and" with --condition; and--.

In Column 20, Line 15, replace "$2 \leq X2 \leq 2$" with --$2 \leq X2 \leq 6$--.

In Column 21, Line 64, replace "cooling, or" with --cooling or--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*